US008587799B2

(12) United States Patent
Kobayashi et al.

(10) Patent No.: US 8,587,799 B2
(45) Date of Patent: Nov. 19, 2013

(54) IMAGE PROCESSING SYSTEM, IMAGE PROCESSING DEVICE, CONTROL METHOD THEREOF AND COMPUTER PROGRAM PRODUCT

(75) Inventors: Minako Kobayashi, Ikeda (JP); Kazumi Sawayanagi, Itami (JP); Hironobu Nakata, Itami (JP); Masakazu Murakami, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 2138 days.

(21) Appl. No.: 11/228,255

(22) Filed: Sep. 19, 2005

(65) Prior Publication Data
US 2006/0176507 A1    Aug. 10, 2006

(30) Foreign Application Priority Data
May 2, 2005 (JP) .................................. 2005-134607

(51) Int. Cl.
G06F 3/12 (2006.01)

(52) U.S. Cl.
USPC .............................. 358/1.15; 358/1.1; 358/1.9

(58) Field of Classification Search
USPC .................................... 358/1.1, 1.15, 1.9, 1.8
See application file for complete search history.

(56) References Cited

U.S. PATENT DOCUMENTS

| | | | |
|---|---|---|---|
| 6,249,356 B1 | 6/2001 | Yoshikawa et al. | |
| 6,252,609 B1 | 6/2001 | Kanno | |
| 6,307,643 B1 | 10/2001 | Okada et al. | |
| 6,609,162 B1 | 8/2003 | Shimizu et al. | |
| 2005/0027825 A1 | 2/2005 | Hikawa et al. | |

FOREIGN PATENT DOCUMENTS

| | | | | |
|---|---|---|---|---|
| JP | 11-075006 A | | 3/1999 | |
| JP | 11-177755 A | | 7/1999 | |
| JP | 11177755 | * | 7/1999 | ............... H04N 1/00 |
| JP | 2000-341455 | | 12/2000 | |
| JP | 2002-135455 A | | 5/2002 | |
| JP | 2002-268857 A | | 9/2002 | |
| JP | 2002268857 | * | 9/2002 | |
| JP | 2004-112715 A | | 4/2004 | |
| JP | 2004112715 | * | 4/2004 | ............... H04N 1/00 |
| JP | 2004-146958 A | | 5/2004 | |
| JP | 2004-147277 A | | 5/2004 | |
| JP | 2004-287861 | | 10/2004 | |
| JP | 2004-320436 A | | 11/2004 | |
| JP | 2004-362458 A | | 12/2004 | |
| JP | 2005-039411 A | | 2/2005 | |
| JP | 2005039411 | * | 2/2005 | ............... H04N 1/00 |

OTHER PUBLICATIONS

English Translation of JP2004112715.*
English Translation of JP2005039411.*

(Continued)

*Primary Examiner* — King Poon
*Assistant Examiner* — Iriana Cruz
(74) *Attorney, Agent, or Firm* — Buchanan Ingersoll & Rooney PC

(57) ABSTRACT

An image processing device, which performs an image-related process about an image in cooperation with another image forming device via a network, is provided with a device configuration detection portion for detecting a function that is added to the image processing device itself, and a new function information notifying portion for notifying another image processing device that a function is added to the image forming device.

17 Claims, 20 Drawing Sheets

(56) References Cited

OTHER PUBLICATIONS

JP2004112715 English translation.*
JP11177755 English translation.*
JP2002268857 English translation.*

Official Communicaton from JPO—Notificaton of Reasons for Refusal dated Feb. 6, 2007", and translation thereof".
Official Action (Decision of Refusal) issued in corres. JP Patent Application No. 2005-134607, Aug. 16, 2007, JPO; and English translation thereof.

* cited by examiner

| USER ID | PASSWORD | ELECTRONIC MAIL ADDRESS | |
|---|---|---|---|
| 100 | 45625 | sato@~.co.jp | ~51a(51) |
| 101 | 37864 | suzuki@~.co.jp | ~51b(51) |
| 102 | 95102 | tanaka@~.co.jp | ~51c(51) |
| ⋮ | ⋮ | ⋮ | |

| FUNCTION NAME | NECESSARY CONFIGURATION | COOPERATION CAPABLE DEVICE | |
|---|---|---|---|
| FAX FUNCTION | FAX MODEM<br>FAX MODEM DRIVER<br>FAX SHARE PROCESS SOFTWARE | DEVICE(S) CAPABLE OF RECEIVING AND SENDING IMAGE DATA | ~52a(52) |
| PERSONAL BOX SHARING FUNCTION | HARD DISK DRIVE<br>HARD DISK DRIVE DRIVER<br>PERSONAL BOX MANAGING SOFTWARE | DEVICE(S) CAPABLE OF SHARING PERSONAL BOX | ~52b(52) |
| AUTOMATIC BIND TRANSMISSION FUNCTION | HARD DISK DRIVE<br>HARD DISK DRIVE DRIVER<br>BINDING SOFTWARE | DEVICE(S) HAVING A CAPACITY MORE THAN A PREDETERMINED CAPACITY | ~52c(52) |
| ... | ... | ... | |

| FUNCTION NAME | SETTING SPECIFICS | |
|---|---|---|
| FAX FUNCTION | REGISTER A FAX JOB ACTION DEVICE<br>REGISTER A FAX FUNCTION SCREEN GENERATING MODULE<br>REGISTER A FAX JOB GENERATING MODULE<br>REGISTER A FAX JOB ACTION ASKING MODULE | ~53a(53) |
| PERSONAL BOX SHARING FUNCTION | REGISTER A DEVICE THAT CAN BE SHARED<br>REGISTER A PERSONAL BOX INFORMATION SENDING MODULE<br>REGISTER A PERSONAL BOX INFORMATION REQUESTING MODULE<br>PERMIT ACCEPTANCE OF BOX FROM EXTERNAL MFP | ~53b(53) |
| AUTOMATIC BIND TRANSMISSION FUNCTION | REGISTER A DEVICE CAPABLE OF AUTOMATIC BINDING<br>CANCEL AUTOMATIC BINDING OF SCAN RECEPTION DATA | ~53c(53) |
| ... | ... | |

| MFP | EXTENSION FUNCTION | |
|---|---|---|
| IMAGE FORMING DEVICE 2A | FAX FUNCTION<br>PERSONAL BOX SHARING FUNCTION<br>AUTOMATIC BIND TRANSMISSION FUNCTION | ~54a(54) |
| IMAGE FORMING DEVICE 2B | PERSONAL BOX SHARING FUNCTION<br>AUTOMATIC BIND TRANSMISSION FUNCTION | ~54b(54) |
| IMAGE FORMING DEVICE 2C | FAX FUNCTION | ~54c(54) |
| ⋮ | ⋮ | |

IMAGE PROCESSING SYSTEM, IMAGE PROCESSING DEVICE, CONTROL METHOD THEREOF AND COMPUTER PROGRAM PRODUCT

This application is based on Japanese Patent Application No. 2005-134607 filed on May 2, 2005, the contents of which are hereby incorporated by reference.

BACKGROUND OF THE INVENTION

1. Field of the Invention

The present invention relates to an image processing device such as an MFP and an image processing system including the image processing device.

2. Description of the Prior Art

Image processors called multifunction devices or multi function peripherals (MFP), which have integrated functions of a copying machine, a network printer, a scanner and the like, are widely available at present. In particular, development of network technologies has enabled various image processes in connection with other image processing devices or personal computers via a network in these years.

Methods for an image processing device to perform a process in cooperation with another image processing device or another personal computer are known well. In addition, some of the methods have become commonplace. For example, a process of sending and receiving fax data, a process of network printing, a process of transmitting a scanned image and the like are used widely. Besides, various cooperating processes are proposed, which include a method of performing plural processes on document data in cooperation with other plural devices as disclosed in Japanese unexamined patent publication No. 2004-287861.

In addition, Japanese unexamined patent publication No. 2000-341455 discloses a method of cooperating processes. According to this document, an image processing device stores information about abilities of devices that can cooperate. When an instruction for a cooperating process is issued, a device that is suitable for the process is selected from registered devices.

However, according to the conventional methods disclosed in the above patent documents, when a new function is added to an image processing device, it is difficult for the other device to perform a process by using the new function promptly in cooperation with the image processing device. In order to perform the process in cooperation with the image processing device, an administrator should do a job of rewriting the information about abilities of devices stored in the other device or other jobs.

Then, however, the larger the number of devices included in the system, the larger the burden imposed on the administrator.

SUMMARY OF THE INVENTION

An object of the present invention is to reduce a work load for enabling a cooperating process by using a new function compared with the conventional method when a new function is added to an image processing device.

An image processing system according to the present invention is an image processing system including a first image processing device and a second image processing device for performing an image-related process about an image in cooperation with the first image processing device via a network. The first image processing device includes an added function detection portion for detecting a function that is added to the first image processing device, and a function addition informing portion for sending to the second image processing device notice information indicating that the function is added to the first image processing device. The second image processing device includes a notice information receiving portion for receiving the notice information, and a setting portion for setting the second image processing device so as to be able to perform the image-related process by using the function that is indicated in the received notice information.

Preferably, the first image processing device is provided with a cooperation capable device determination portion for determining the second image processing device that is capable of a process in cooperation with the first image processing device by using the detected function, and the function addition informing portion sends the notice information to the second image processing device that is determined by the cooperation capable device determination portion to be capable of performing the image-related process in cooperation with the first image processing device by using the function.

Furthermore, the first image processing device may be provided with a set change method informing portion for informing the second image processing device that is determined to be capable of performing the image-related process in cooperation with the first image processing device by using the function about a method of changing the setting of the second image processing device so as to be capable of performing the image-related process by using the function.

According to the present invention, when a new function is added to the image processing device, a work load for enabling a cooperating process by using the function can be reduced compared with the conventional method.

According to another aspect of the present invention, when a new function is added to one of the image processing devices, a work for the other image processing device to be capable of performing a cooperating process by using the function can be performed without burdening an administrator.

According to another aspect of the present invention, a notice of a new function that is added to the image processing device can be performed without waste. Therefore, a work load for enabling a cooperating process can be reduced compared with the conventional method.

BRIEF DESCRIPTION OF THE DRAWINGS

FIG. 5 is a diagram showing an example of a user information table.

FIG. 7 is a diagram showing an example of an extension function information table.

FIG. 10 is a diagram showing an example of a function adding process information table.

FIG. 11 is a diagram showing an example of an MFP-specific extension function information table.

DESCRIPTION OF THE PREFERRED EMBODIMENTS

Hereinafter, the present invention will be explained more in detail with reference to embodiments and drawings.

Figure 1:
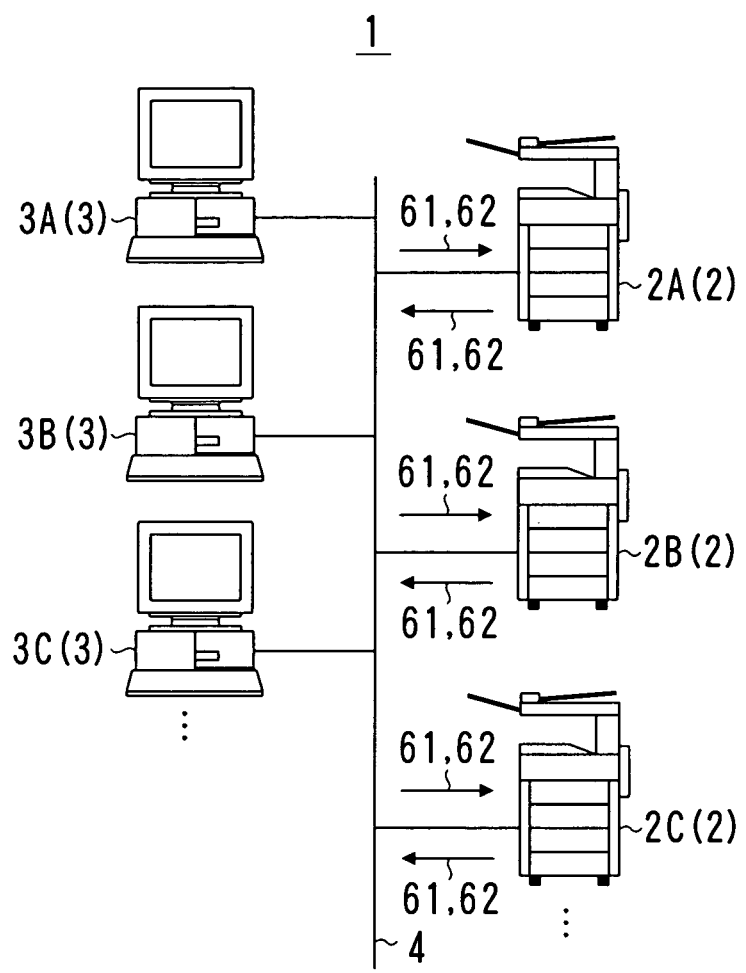
FIG. 1 is a diagram showing an example of a general structure of an image processing cooperating system.
Figure 2:
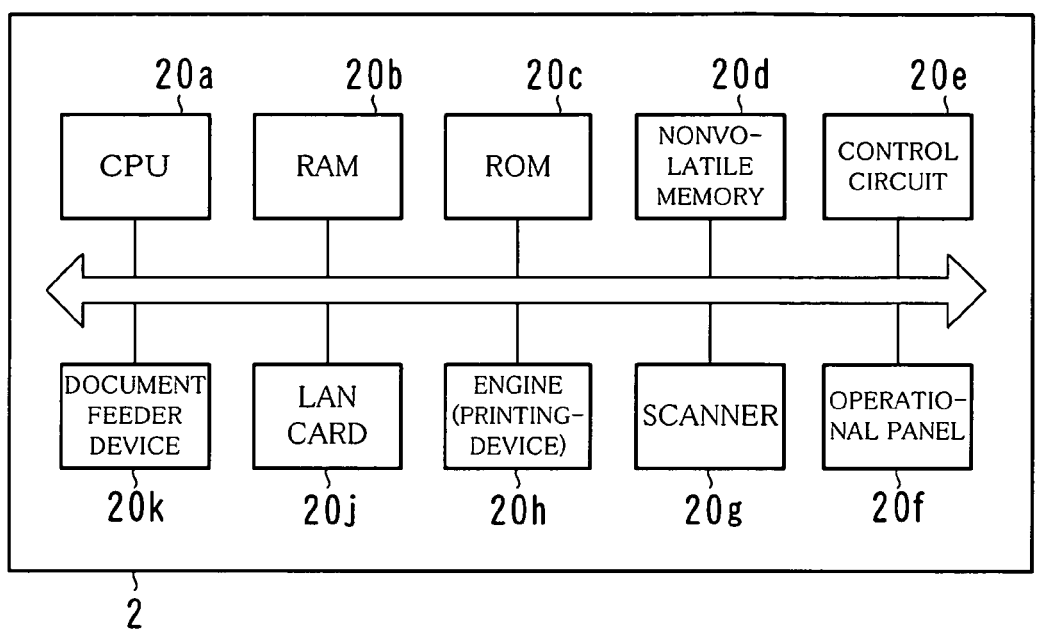
FIG. 2 is a diagram showing an example of a hardware structure of an image forming device.
Figure 3:
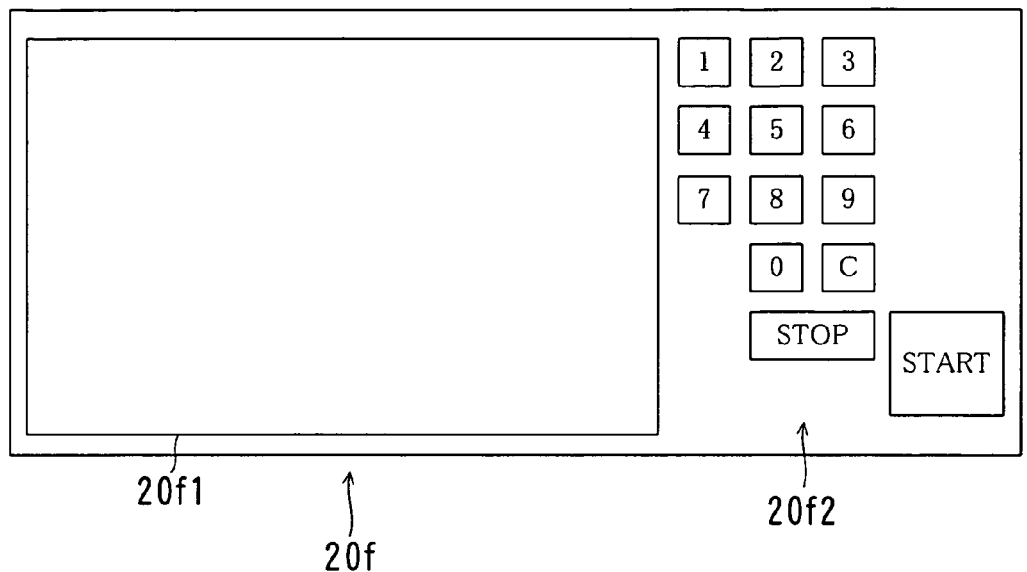
FIG. 3 is a diagram showing an example of an operation panel.
Figure 4:
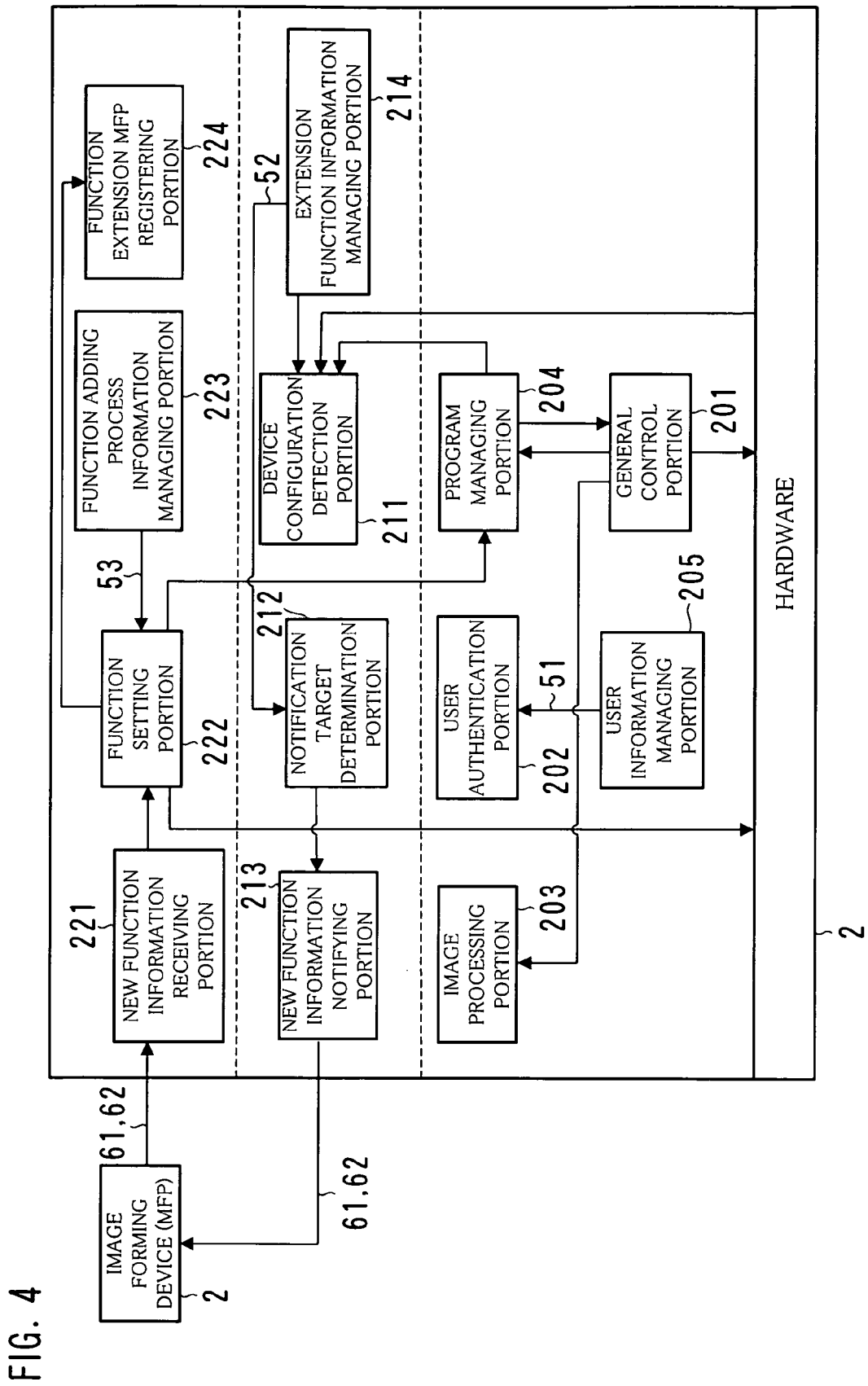
FIG. 4 is a diagram showing an example of a functional structure of the image forming device.

FIG. 1 is a diagram showing an example of a general structure of an image processing cooperating system 1, FIG. 2 is a diagram showing an example of a hardware structure of an image forming device 2, FIG. 3 is a diagram showing an example of an operation panel 20f, and FIG. 4 is a diagram showing an example of a functional structure of the image forming device 2.

The image processing cooperating system 1 according to the present invention includes a plurality of image forming devices 2 (2A, 2B, . . . ), a plurality of terminal devices 3 (3A, 3B, . . . ), and a communication line 4 as shown in FIG. 1. These devices are connected to each other via the communication line 4. As the communication line 4, the Internet, a LAN, or a private line can be used, for example. In this embodiment, a LAN is used as the communication line 4.

An IP address is assigned to each of the image forming devices 2 and the terminal devices 3. As a communication protocol, a file transfer protocol (FTP) or a server message block (SMB) can be used. These devices can communicate data with each other.

The image processing cooperating system 1 is installed in an office or a school. Plural employees, teachers, or students (hereinafter referred to as "users" simply) share the image forming device 2 or the terminal device 3 that is included in the image processing cooperating system 1.

The image forming device 2 is a device having integrated functions of a copying machine, a network printer, a scanner and the like. This is also called a multifunction device or multi function peripherals (MFP). This image forming device 2 can extend its function by adding hardware or software. For example, various functions can be added for realizing an image-related process such as a fax function, a personal box sharing function, or an automatic bind transmission function.

The "fax function" is a function of communicating fax data with a fax terminal that exists outside the image processing cooperating system 1.

The "box" is a logical storage area that is provided in a storage medium, and it corresponds to a folder or a directory in a personal computer. The box is assigned to each user so that the user can store document data such as an image file in his or her box. Hereinafter the box assigned to a user is referred to as a "personal box". The "personal box sharing function" is a function for enabling another image forming device 2 or another terminal device 3 to use a personal box provided to an image forming device 2.

The "automatic bind transmission function" is a function of binding image data of pages of an original into one image file and sending the file to a designated destination automatically.

As shown in FIG. 2, the image forming device 2 includes a CPU 20a, a RAM 20b, a ROM 20c, a nonvolatile memory 20d, a control circuit 20e, an operation panel 20f, a scanner 20g, a printing device 20h, a LAN card 20j, and a document feeder device 20k.

The scanner 20g is a device for optically reading an image including photographs, characters, pictures and charts on a sheet of an original (hereinafter referred to as an "original" simply) and producing image data. The document feeder device 20k is a device for feeding one or more set original sequentially to the scanner 20g.

The printing device 20h is a device for printing an image read by the scanner 20g or an image of image data sent from the terminal device 3 or the like on paper in accordance with designation by a user.

The operation panel 20f is made up of a display 20f1 and an operation button unit 20f2 including plural operation buttons as shown in FIG. 3.

The operation button unit 20f2 is made up of plural keys for entering numbers, characters or signs, a sensor for recognizing a pressed key, and a transmission circuit for transmitting a signal indicating a recognized key to the CPU 20a.

The display 20f1 displays a screen for giving a message or an instruction to a user who operates this image forming device 2, a screen for the user to enter setting specifics and process specifics, and a screen for showing an image formed by the image forming device 2 and a process result. In this embodiment, a touch panel is used for the display 20f1. Therefore, the display 20f1 has a function of detecting a position on the touch panel where a user touches with a finger, and a function of sending a signal indicating a detection result to the CPU 20a.

As described above, the operation panel 20f plays a role as a user interface for a user who operates the image forming device 2 directly. Note that an application program and a driver for giving instructions to the image forming device 2 are installed in the terminal device 3. Therefore, the user can also operate the image forming device 2 from a remote location by using the terminal device 3.

The LAN card 20j shown in FIG. 2 is a network interface card (NIC) for performing communication with the terminal device 3.

The control circuit 20e is a circuit for controlling devices including the nonvolatile memory 20d, the scanner 20g, the printing device 20h, the LAN card 20j, the operation panel 20f and the document feeder device 20k.

The nonvolatile memory 20d is a rewritable and nonvolatile memory such as an EEPROM or a flash memory. The ROM 20c is a read only memory. Although a ROM is included in nonvolatile memories in general, an EEPROM or a flash memory is discriminated from a ROM in this embodiment. The former is referred to as the "nonvolatile memory 20d" and the latter is referred to as the "ROM 20c".

The nonvolatile memory 20d stores programs, data and the like for realizing functions including a general control portion 201, a user authentication portion 202, an image processing portion 203, a program managing portion 204, a user information managing portion 205, a device configuration detection portion 211, a notification target determination portion 212, a new function information notifying portion 213, an extension function information managing portion 214, a new function information receiving portion 221, a function setting portion 222, a function adding process information managing portion 223, and a function extension MFP registering portion 224 as shown in FIG. 4. The programs are executed by the CPU 20a. A part or a whole of the programs or the data may be stored in the ROM 20c. Alternatively, it is possible to design to realize a part or a whole of the functions shown in FIG. 4 by the control circuit 20e.

An application program and a driver corresponding to the image forming device 2 are installed in the terminal device 3 as described above. As the terminal device 3, a personal computer, a workstation or a personal digital assistant (PDA) can be used.

Hereinafter, process specifics of each portion of the image forming device 2 shown in FIG. 4 will be described by dividing them broadly into a basic process, a process when a function is added to the image forming device 2 itself, and a process when a function is added to another image forming device 2.

[Basic process]

Figure 6:
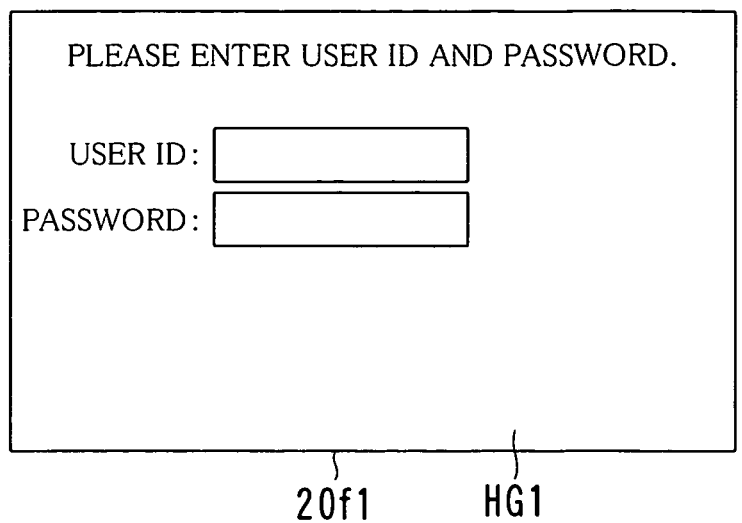
FIG. 6 is a diagram showing an example of a log in screen.

FIG. 5 is a diagram showing an example of a user information table TB1, and FIG. 6 is a diagram showing an example of a log in screen HG1.

The general control portion 201 controls the entire of the image forming device 2 so that basic processes are performed. For example, it performs the control so that a predetermined screen is displayed at a predetermined timing, and that an operation performed by the user is accepted, and that a job such as scanning, printing or data transmission is performed in accordance with the operation.

The program managing portion 204 controls the programs that are installed in the image forming device 2. A program for extending a function is also controlled by this program managing portion 204.

The user information managing portion 205 stores and manages the user information table TB1. This user information table TB1 stores user information 51 (51a, 51b, . . . ) including user IDs (user accounts), passwords and electronic mail addresses for communication of users who can use the image forming device 2 as shown in FIG. 5.

The user authentication portion 202 performs an authentication whether a person who is going to use the image forming device 2 is an authorized user or not. This authentication is performed in the following procedure. When nobody uses the image forming device 2 directly, the log in screen HG1 as shown in FIG. 6 is displayed on the display 20f1. A user who wants to use the image forming device 2 operates the operation button unit 20f2 so as to enter his or her user ID and password. Then, the general control portion 201 accepts the user ID and password, and it instructs the user authentication portion 202 to perform the process of the user authentication.

The user authentication portion 202 extracts the user information 51 that has the user ID of the same value as the entered user ID from the user information table TB1 shown in FIG. 5. Then, it compares the entered password with the password indicated in the user information 51, so as to authenticate that the user is an authorized user if the comparison result indicates that both the passwords are identical with each other. If the comparison result indicates that they are not identical, the user is decided to be an unauthorized user. If the user information table TB1 does not include the user information 51 having a user ID having the same value as the entered user ID, the person is also decided to be an unauthorized user. The person who was decided to be an unauthorized user cannot use the image forming device 2.

The user who received the authentication to be an authorized user is allowed to use the image forming device 2. In other words, the user can log in the image forming device 2. Then, the general control portion 201 displays a menu screen on the display 20f1. Here, the user can perform a predetermined operation so as to instruct the image forming device 2 to perform a desired process.

The image processing portion 203 performs image processing such as a process of digitizing an image read by the scanner 20g, a process of format transformation of image data or a process of enlarging or reducing an image. [Process when a function is added to the image forming device 2 itself]

Figure 8:
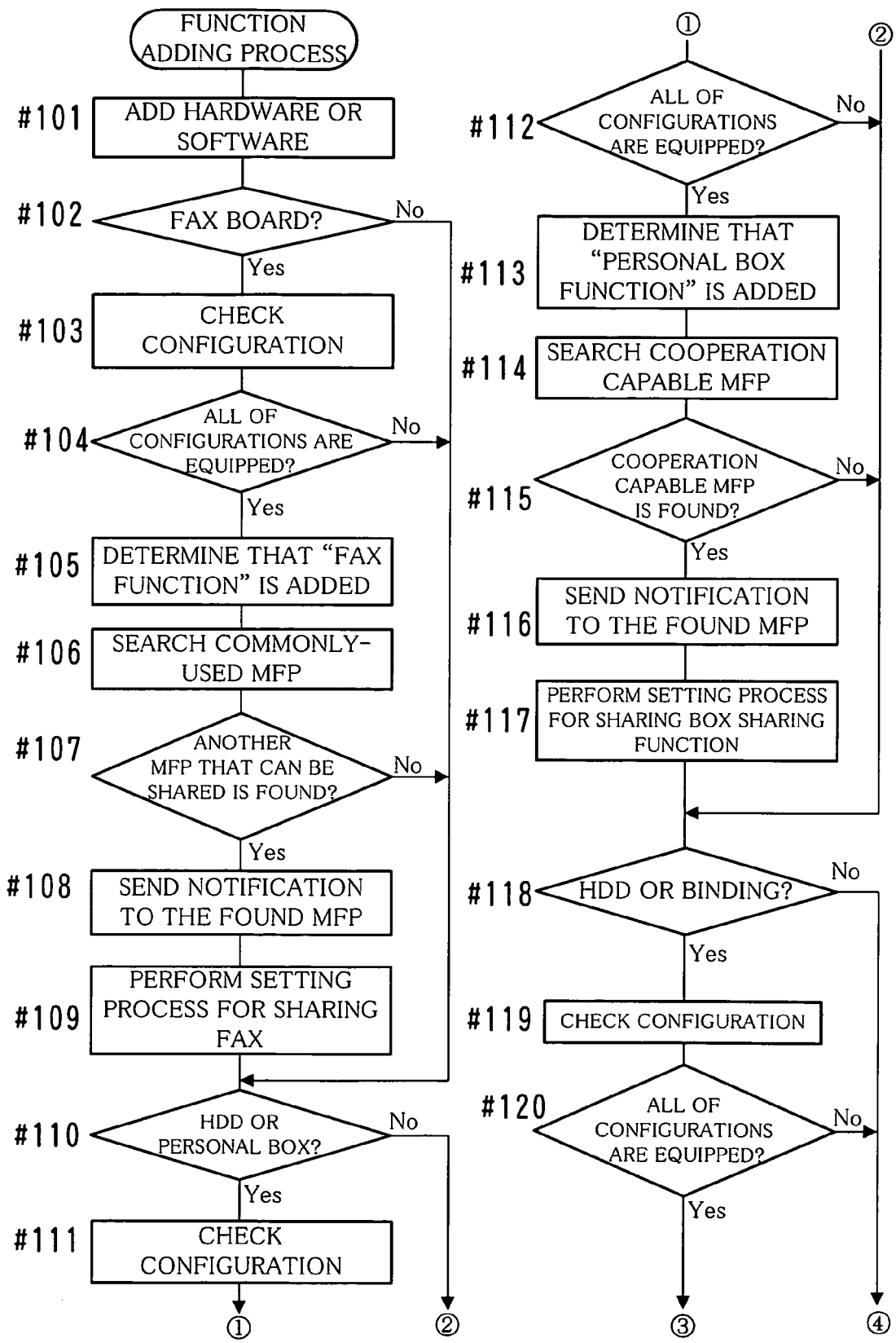
FIG. 8 is a flowchart showing an example of a flow of a function adding process.
Figure 9:
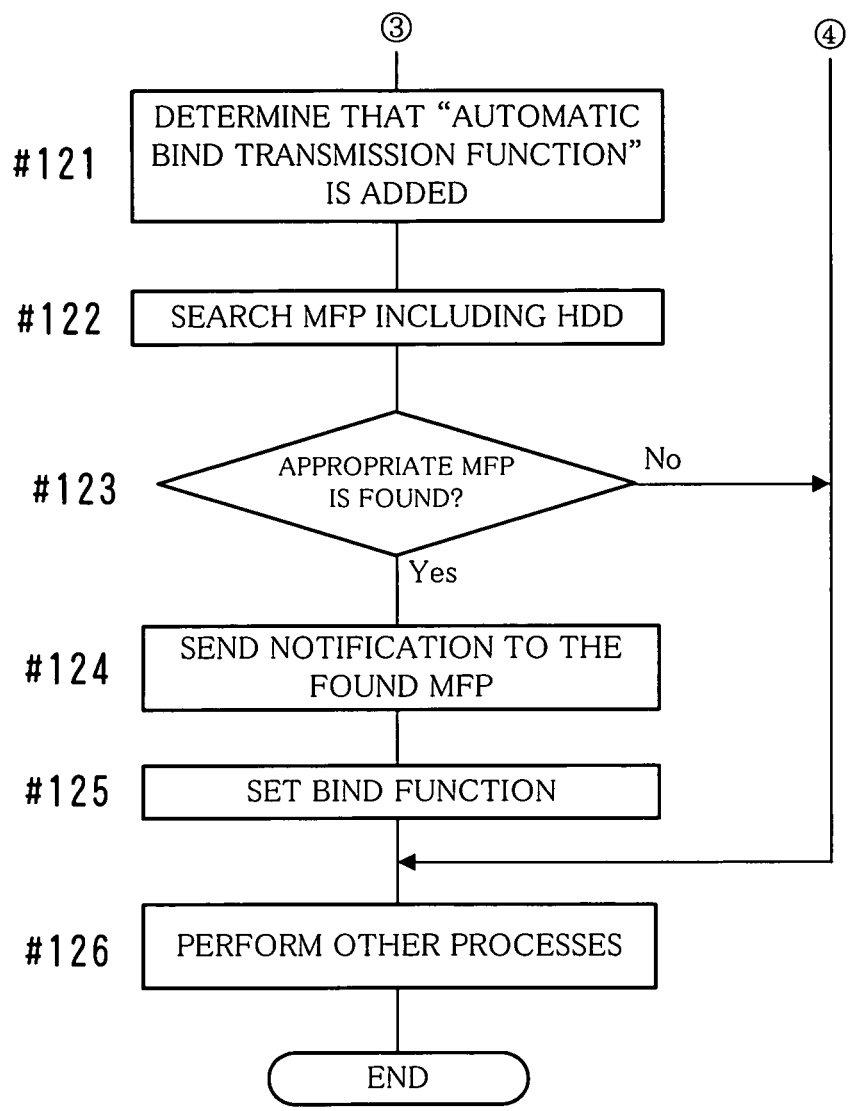
FIG. 9 is a flowchart showing an example of a flow of the function adding process.

FIG. 7 is a diagram showing an example of an extension function information table TB2, FIGS. 8 and 9 are flowcharts showing an example of a flow of a function adding process.

The extension function information managing portion 214 stores and manages the extension function information table TB2. This extension function information table TB2 includes extension function information 52 about functions that can be added to the image forming device 2 as shown in FIG. 7. One piece of extension function information 52 is provided for each function that can be added.

A "function name" of the extension function information 52 is a name of the function, which is used for discriminating the function from other functions. A "necessary configuration" indicates hardware and software necessary for realizing the function. A "cooperation capable device" indicates which MFP (image forming device 2) or terminal device 3 it can cooperate with for a practical process by using the function. For example, according to the extension function information 52a, it is understood that a fax modem, a fax modem driver and fax share process software are necessary for adding the fax function, and that it is possible after adding the fax function to perform a process in cooperation with another image forming device 2 or another terminal device 3 that is capable of receiving and sending image data.

Note that the fax share process software, the personal box managing software and binding software include programs for performing processes shown in FIGS. 14, 16 and 15, respectively, which will be described later.

The device configuration detection portion 211 detects hardware and software that are newly added to the image forming device 2. It is supposed that an engineer dispatched from a manufacturer of the image forming device 2 performed a work of adding hardware or installing software to the image forming device 2, for example. Then, the device configuration detection portion 211 recognizes and detects the newly added hardware and software by comparing a configuration of the image forming device 2 before the work with a configuration of the image forming device 2 after the work.

Furthermore, the device configuration detection portion 211 detects functions that have become available when the hardware or the software is newly added to the image forming device 2.

The notification target determination portion 212 determines which of the image forming devices 2 and the terminal devices 3 are to be notified about the function that has become available. The new function information notifying portion 213 notifies the image forming device 2 and the terminal device 3 that are determined by the notification target determination portion 212 about the new function.

The device configuration detection portion 211, the notification target determination portion 212 and the new function information notifying portion 213 perform each process in the procedure shown in FIGS. 8 and 9, for example.

When the device configuration detection portion 211 detects that hardware or software is added to the image forming device 2 (#101 in FIG. 8), it further detects a function that has become available along with the extension of hardware or software this time in accordance with the detection result and the extension function information 52 stored in the extension function information table TB2 shown in FIG. 7 as follows. In addition, the notification target determination portion 212 and the new function information notifying portion 213 perform the following process in accordance with the result of detecting the function.

If the device configuration detection portion 211 detects one of the configurations shown in the extension function information 52a, i.e., any one of a fax modem, a fax modem driver and a fax share process software (Yes in #102), it checks whether or not the image forming device 2 has been equipped with all of the necessary configuration shown in the extension function information 52a due to the extension this time (#103). If it has been equipped with all items of the necessary configuration (Yes in #104), it is detected that the fax function is added to the image forming device 2 (#105).

Then, the notification target determination portion 212 searches another image forming device 2 or another terminal device 3 that is capable of performing a process in cooperation with each other by using this fax function, namely a device that satisfies the condition shown in the "cooperation capable device" of the extension function information 52a (#106).

The search may be performed by inquiring each device that is provided to the image processing cooperating system 1 whether the condition is satisfied or not. In addition, range of the search may be limited to devices on the same subnet as this image forming device 2 by referring the subnet mask. This process may also be applied to the steps #114 and #122 that will be described later.

If another image forming device 2 or another terminal device 3 that satisfies the condition is found (Yes in #107), the new function information notifying portion 213 sends the function addition information 61 that indicates that the fax function is added to the image forming device 2 to the other image forming device 2 and the other terminal device 3 that were found (#108). Thus, notification that the fax function is added is performed.

Then, the portions of the image forming device 2 perform various setting processes so that devices of the destination of notification can share the fax function that has been added to the image forming device 2 (#109). More specifically, they perform the setting for enabling performance of a fax transmission job requested from another image forming device 2 and another terminal device 3, and setting for performing a process of relaying fax data sent to a destination of the other image forming device 2 or the other terminal device 3.

Alternatively, if the device configuration detection portion 211 detects one of the configurations shown in the extension function information 52b, i.e., any one of a hard disk drive, a hard disk drive driver and a box managing software (Yes in #110), it checks whether or not the image forming device 2 has been equipped with all of the necessary configuration indicated in the extension function information 52b due to the extension this time (#111). If it has been equipped with all items of the necessary configuration (Yes in #112), it is detected that the personal box sharing function is added to the image forming device 2 (#113).

The notification target determination portion 212 searches another image forming device 2 or another terminal device 3 that is capable of performing a process in cooperation with each other by using the personal box sharing function, namely a device that satisfies the condition shown in the "cooperation capable device" of the extension function information 52b (#114).

If another image forming device 2 or another terminal device 3 that satisfies the condition is found (Yes in #115), the new function information notifying portion 213 sends the function addition information 61 that indicates that the personal box sharing function is added to the image forming device 2 to the other image forming device 2 and the other terminal device 3 that were found (#116). Thus, notification that the personal box sharing function is added is performed.

Then, the portions of the image forming device 2 perform various setting processes so that other devices can share the personal box sharing function that has been added to the image forming device 2 (#117). More specifically, they perform the setting of the personal boxes of users registered in the user information table TB1 (see FIG. 5) and the setting for enabling the other image forming device 2 and the other terminal device 3 to share the personal boxes.

Alternatively, if the device configuration detection portion 211 detects one of the configurations shown in the extension function information 52c, namely a hard disk drive, a hard disk drive driver, or a binding software (Yes in #118), it checks whether or not the image forming device 2 has been equipped with all of the necessary configuration indicated in the extension function information 52c due to the extension this time (#119). If it has been equipped with all items of the necessary configuration (Yes in #120), it is detected that the automatic bind transmission function is added to the image forming device 2 (#121 shown in FIG. 9).

The notification target determination portion 212 searches another image forming device 2 or another terminal device 3 that is capable of performing a process in cooperation with each other by using the automatic bind transmission function, namely a device that satisfies the condition shown in the "cooperation capable device" of the extension function information 52c (#122).

If another image forming device 2 or another terminal device 3 that satisfies the condition is found (Yes in #123). The new function information notifying portion 213 sends the function addition information 61 that indicates that the automatic bind transmission function is added to the image forming device 2 to the other image forming device 2 and the other terminal device 3 that were found (#124). Thus, notification that the automatic bind transmission function is added is performed. Then, the portions of the image forming device 2 perform various setting processes if necessary so as to perform a process in cooperation with the other image forming device 2 or the other terminal device 3 by using the automatic bind transmission function that is added to the image forming device 2 (#125).

[Process when a function is added to the other image forming device 2]

FIG. 10 is a diagram showing an example of a function adding process information table TB3, FIG. 11 is a diagram showing an example of an MFP-specific extension function information table TB4.

With reference to FIG. 4 again, the function adding process information managing portion 223 stores and manages the function adding process information table TB3. This function adding process information table TB3 includes function adding process information 53 (53a, 53b, . . . ) about the setting process to be performed by the image forming device 2 when a function is added to another image forming device 2 as shown in FIG. 10. The setting specifics will be described later.

The function extension MFP registering portion 224 stores and manages the MFP-specific extension function information table TB4. The MFP-specific extension function information table TB4 includes extended function information 54 (54a, 54b, ... ) that indicates which function is added to each of the image forming devices 2 provided to the image processing cooperating system 1 as shown in FIG. 11. The specifics of the MFP-specific extension function information table TB4 are updated in accordance with the specifics of the function addition information 61 sent from the other image forming device 2. For example, if the function addition information 61 that indicates the personal box sharing function is added is sent from the image forming device 2C, information of the "personal box sharing function" is added to the "extended functions" of the extended function information 54c.

The new function information receiving portion 221 receives the function addition information 61 from the other image forming device 2 to which a new function is added, and the function addition information 61 indicates the newly added function.

The function setting portion 222 performs setting or the like for enabling this image forming device 2 to perform a process that will be described later with reference to FIG. 18 in cooperation with the other image forming device 2 that sent this function addition information 61 in accordance with the received function addition information 61 and function adding process information table TB3.

For example, if the function addition information 61 that was received from the other image forming device 2 indicates that the fax transmission function was added to the other image forming device 2, the other image forming device 2 is registered as a candidate of devices for acting as the fax job in this image forming device 2 (i.e., the "fax transmission function" is added to the "extended functions" of the extended function information 54 of the other image forming device 2) so as to set for the user to be able to select the other image forming device 2. Furthermore, a program for generating a screen concerning transmission and reception of fax (a fax function screen generating module), a program for generating a fax job (a fax job generating module), and a program for asking the other image forming device 2 to execute the fax job (a fax job action asking module) are registered in the program managing portion 204, so that these programs can be retrieved responding to necessity.

Alternatively, if the function addition information 61 indicates that the personal box sharing function is added to the other image forming device 2, the "personal box sharing function" is added to the "extension function" of the extended function information 54 of the other image forming device 2, so that the other image forming device 2 is registered as a sharing partner of the personal box. A program for sending information of the personal box of the image forming device 2 to the other image forming device 2 (a personal box information sending module) and a program for requesting and obtaining information of the personal box that is provided to the other image forming device 2 (a personal box information requesting module) are registered to the program managing portion 204, so that these programs can be retrieved responding to necessity. Furthermore, an access right for receiving an access from the other image forming device 2 to the personal box of this image forming device 2 or the like is set.

Alternatively, if the function addition information 61 indicates that the automatic bind transmission function is added to the other image forming device 2, the "automatic bind transmission function" is added to the "extension function" of the extended function information 54 of the other image forming device 2, so as to recognize that the other image forming device 2 performs the automatic bind transmission. Furthermore, setting for automatically binding plural image files that have been sent from the other image forming device 2 constantly is canceled.

Figure 12:
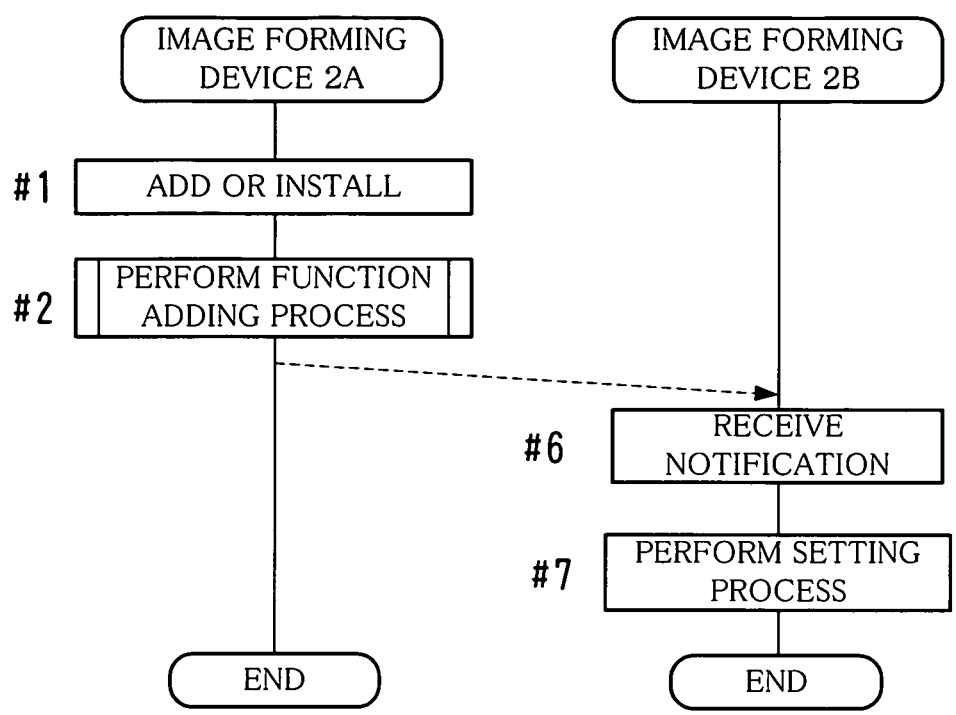
FIG. 12 is a flowchart showing an example of a flow of a process when hardware or software is added to an image forming device.

FIG. 12 is a flowchart showing an example of a flow of a process when hardware or software is added to an image forming device 2. Next, a flow of processes of the image forming device 2A and the other image forming device 2 will be described with reference to the flowchart shown in FIG. 12 by using an example of the case where a function is added to the image forming device 2A.

When hardware is added to the image forming device 2A or software is installed in the same (#1 in FIG. 12), the image forming device 2A performs a process for adding a function to the image forming device 2A itself (#2). In other words, it discriminates the function that has become available by this extension or installation, so that the user can use the function. In addition, it discriminates the other image forming device 2 that can perform the cooperating process by using the function, so as to send to the other image forming device 2 the function addition information 61 indicating that the function has been added (extended). These process specifics have been described above with reference to FIGS. 8 and 9.

For example, it is supposed that the image forming device 2A knew that the cooperating process could be possible together with the image forming device 2B in the step #2 and it sent the function addition information 61 to the image forming device 2B. In this case, when the image forming device 2B receives the function addition information 61 from the image forming device 2A (#6), it performs various setting processes by using the function that was added to the image forming device 2A and is indicated in the function addition information 61, so that a process can be performed in cooperation with the image forming device 2A (#7). For example, if the function that was added to the image forming device 2A is the fax function, the setting process indicated in the function adding process information 53a shown in FIG. 10 is performed as described before.

Figure 13:
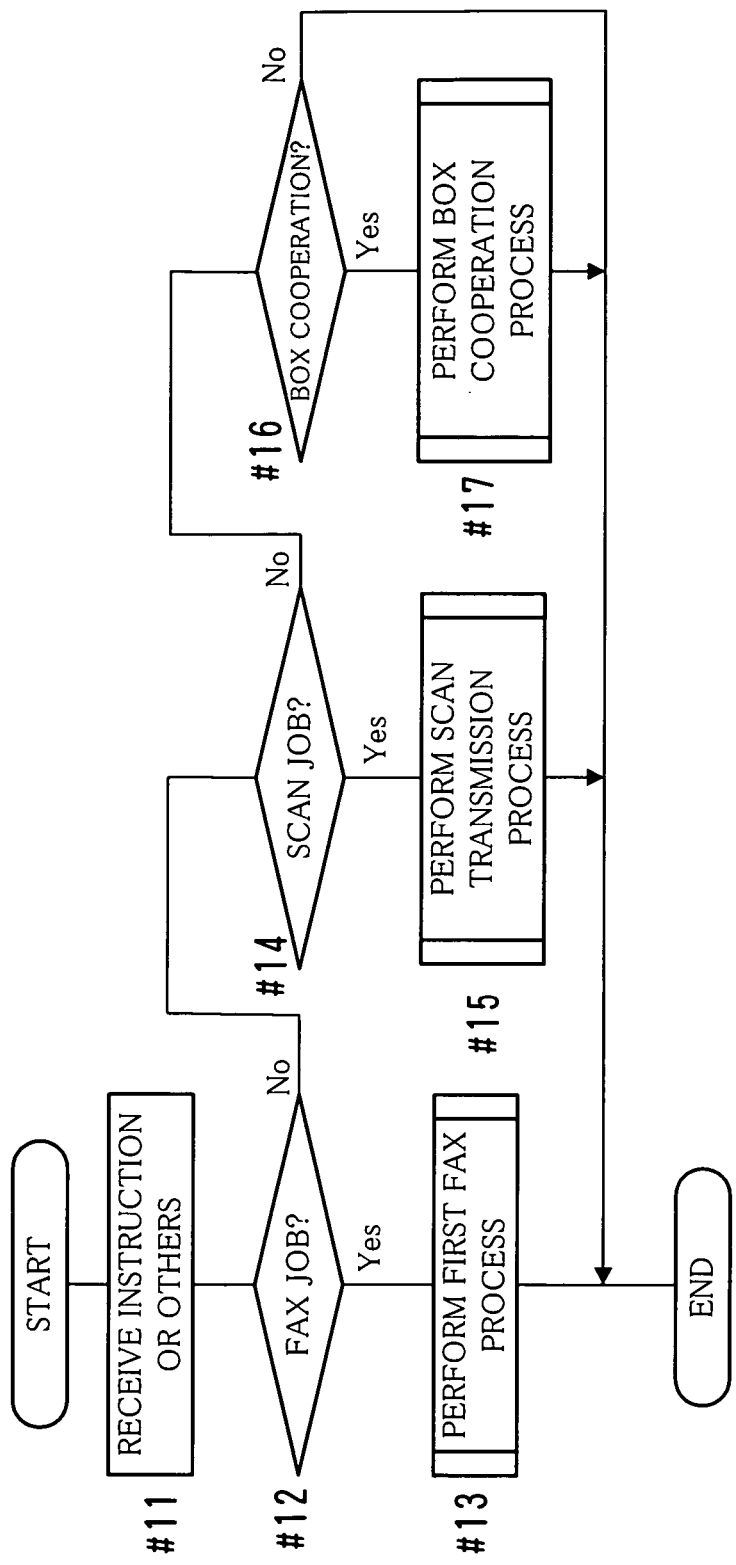
FIG. 13 is a flowchart showing an example of a flow of an image-related process in the image forming device to which a new function is added.
Figure 14:
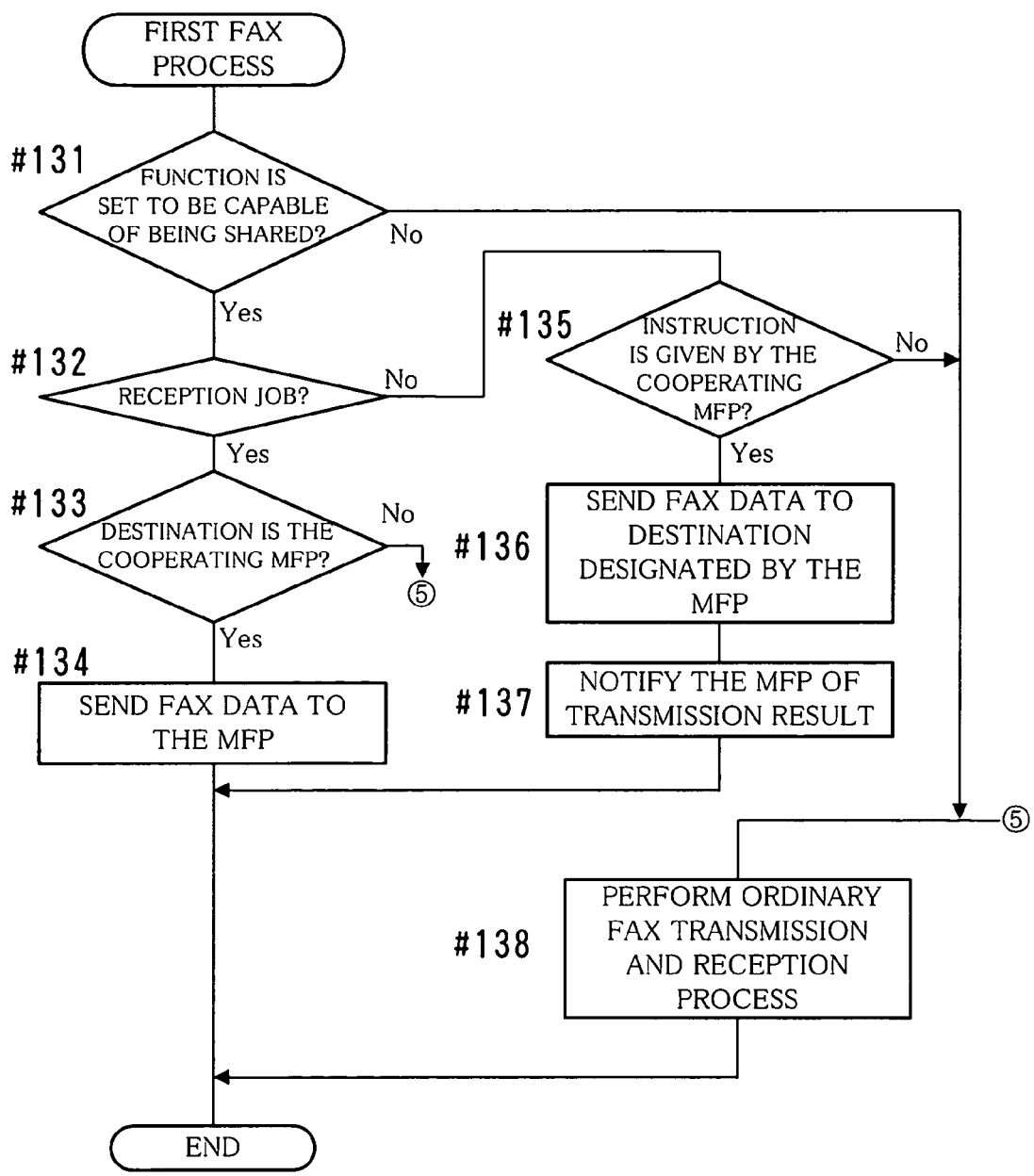
FIG. 14 is a flowchart showing an example of a flow of a first fax process.
Figure 15:
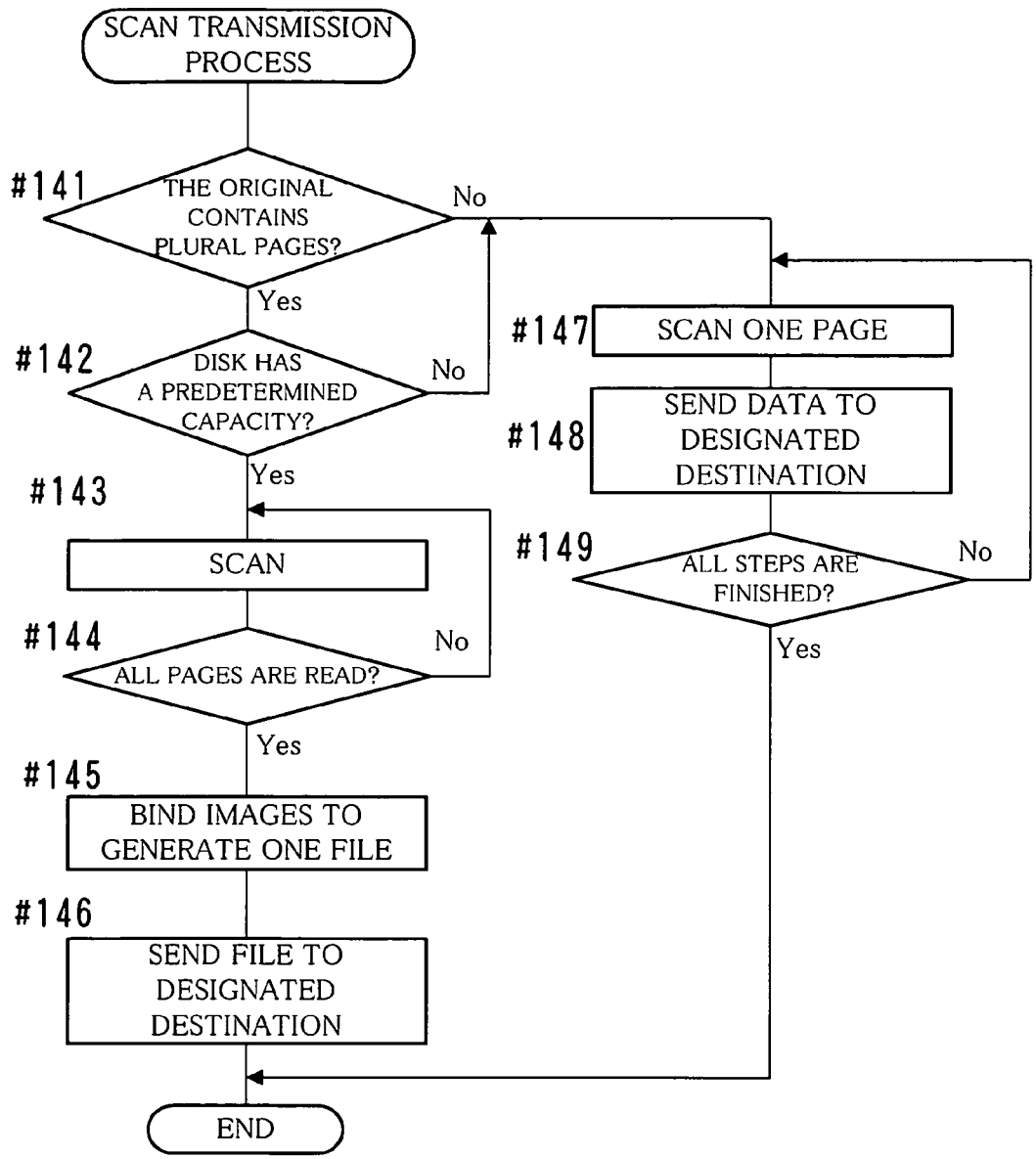
FIG. 15 is a flowchart showing an example of a flow of a scan transmission process.
Figure 16:
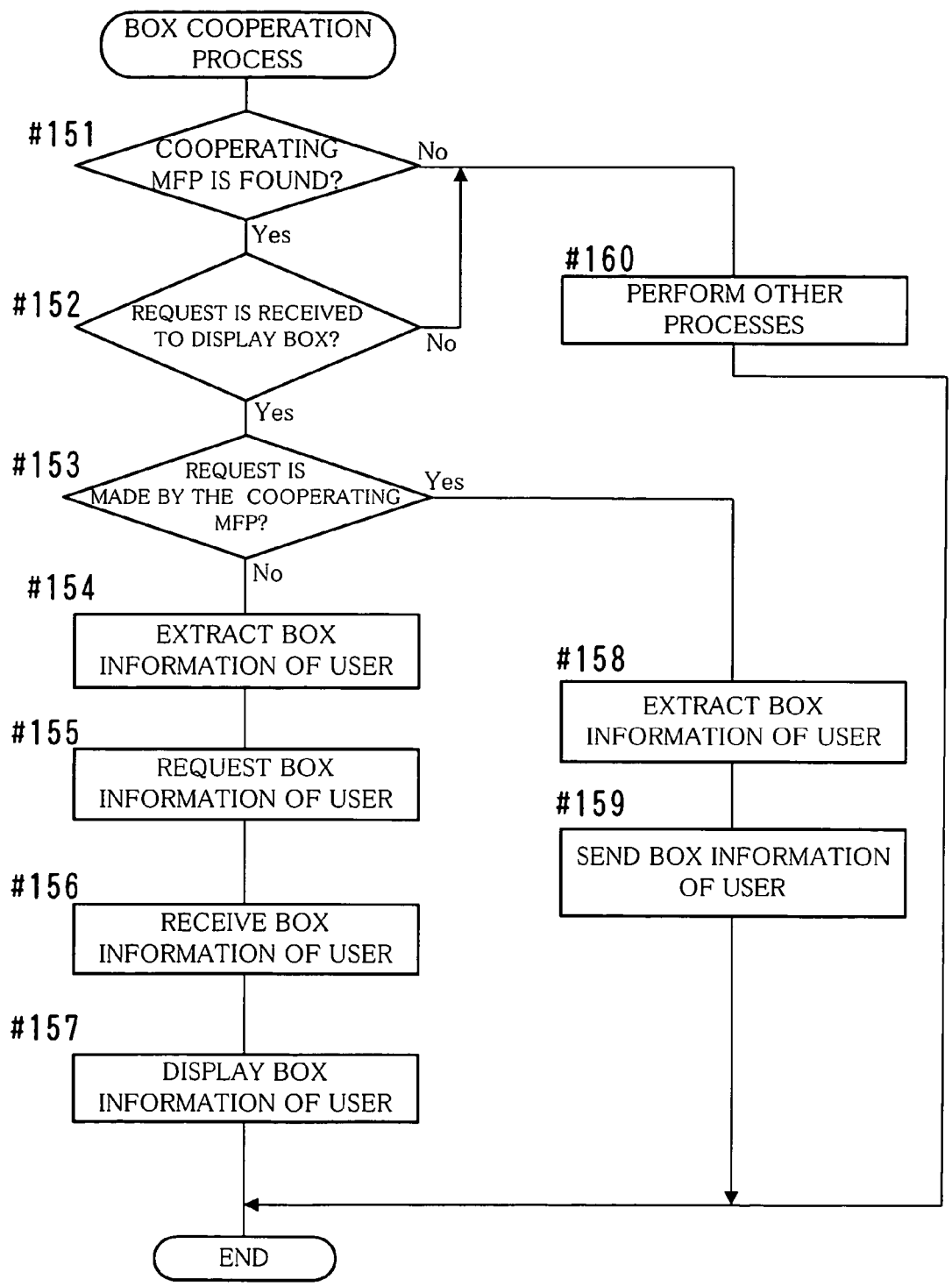
FIG. 16 is a flowchart showing an example of a flow of a box cooperating process.
Figure 17:
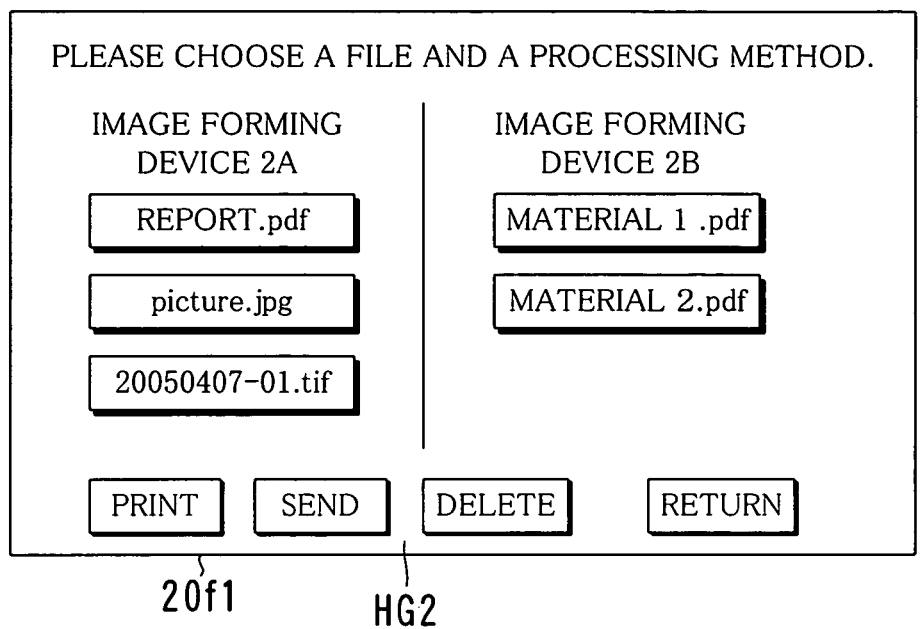
FIG. 17 is a diagram showing an example of a list screen.
Figure 18:
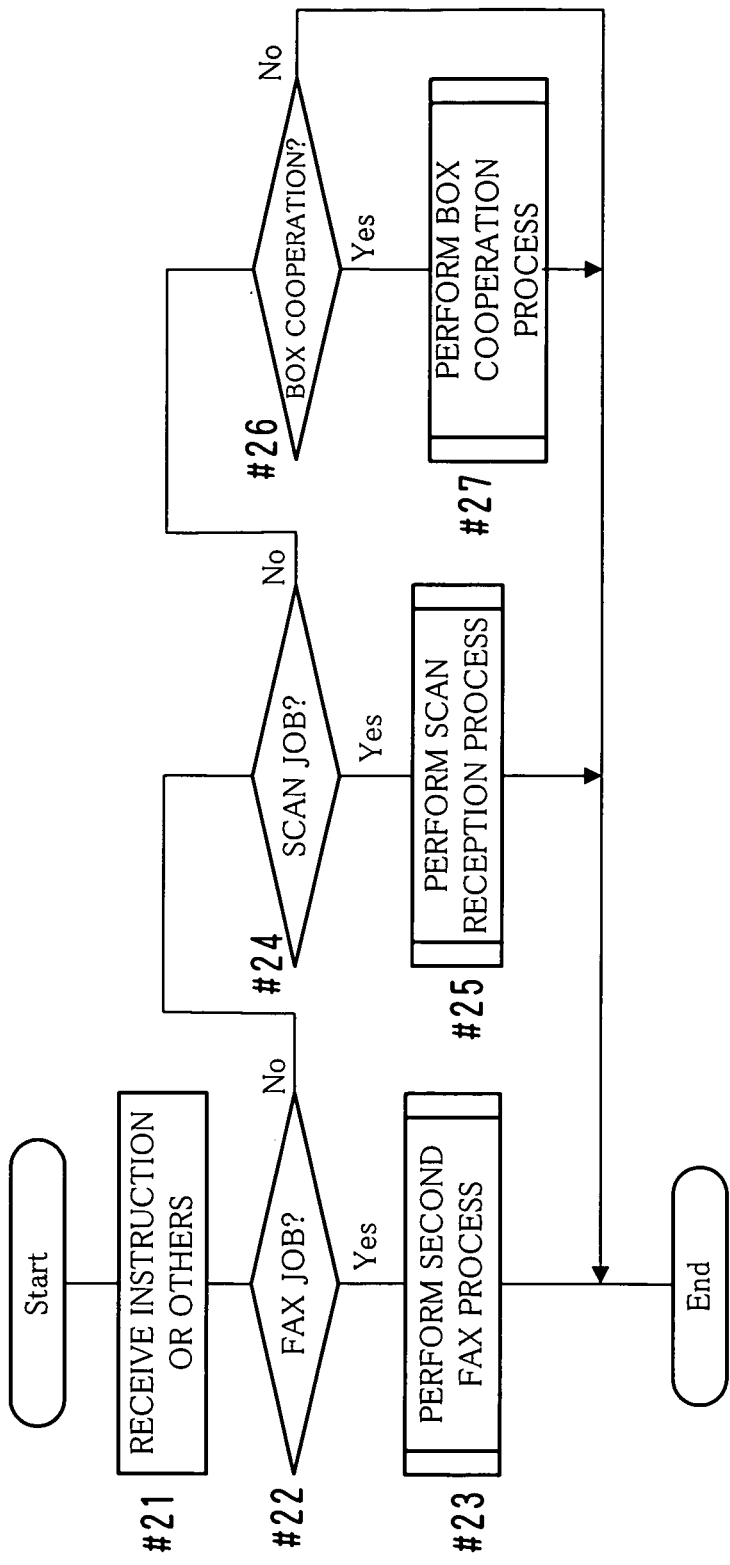
FIG. 18 is a flowchart showing an example of a procedure when an image forming device performs a process in cooperation with another image forming device by using a function that is added to the other image forming device.
Figure 19:
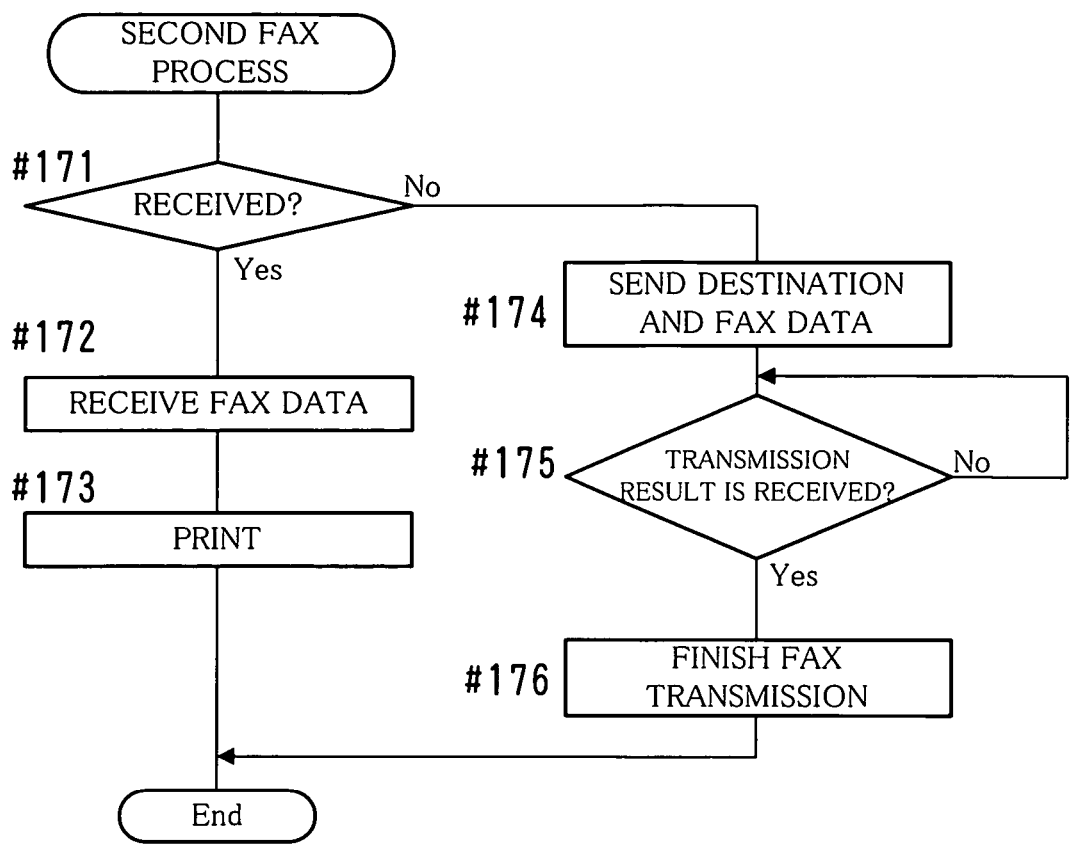
FIG. 19 is a flowchart showing an example of a flow of a second fax process.
Figure 20:
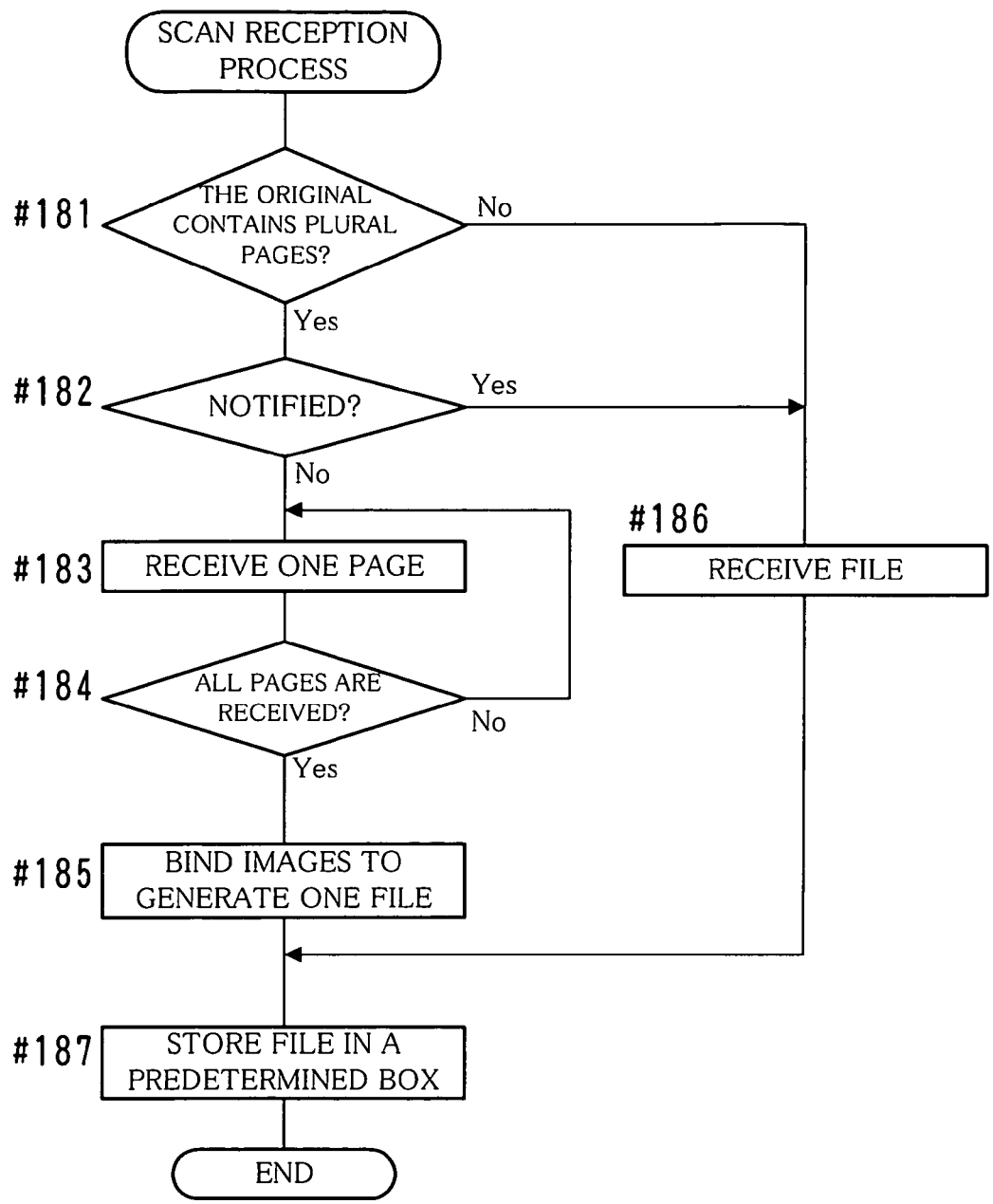
FIG. 20 is a flowchart showing an example of a flow of a scan reception process.

FIG. 13 is a flowchart showing an example of a flow of an image-related process in the image forming device 2 to which a new function is added, FIG. 14 is a flowchart showing an example of a flow of a first fax process, FIG. 15 is a flowchart showing an example of a flow of a scan transmission process, FIG. 16 is a flowchart showing an example of a flow of a box cooperating process, FIG. 17 is a diagram showing an example of a list screen HG2, FIG. 18 is a flowchart showing an example of a procedure when an image forming device 2 performs a process in cooperation with another image forming device 2 by using a function that is added to the other image forming device 2, FIG. 19 is a flowchart showing an example of a flow of a second fax process, and FIG. 20 is a flowchart showing an example of a flow of a scan reception process.

Next, a procedure when the image forming device 2A and the image forming device 2 performs a process in cooperation with each other will be described with reference to the flowchart shown in FIG. 13 by exemplifying the case where the fax function, the personal box sharing function and the automatic bind transmission function are added to the image forming device 2A.

When the image forming device 2A receives an instruction or data from a user of the image forming device 2A, the other image forming device 2 or an external device of the image processing cooperating system 1 (#11 in FIG. 13), the following process is performed corresponding to the process specifics.

If an instruction concerning fax transmission and reception is received (Yes in #12), the process as shown in FIG. 14 is performed (#13).

In other words, if it is set that the fax function of the image forming device 2A cannot be used by any of other image forming devices 2 (No in #131 shown in FIG. 14), the conventional fax sending and receiving process is performed (#138).

If it is set that another image forming device 2 (for example, the image forming device 2B) is permitted to use the fax function (Yes in #131), the following process is performed.

If the fax data are received from the fax terminal that is provided outside the image processing cooperating system 1 via a public line (a so-called fixed telephone line or ISDN line) (Yes in #132), it is checked whether the destination of the fax data is the image forming device 2A or the image forming device 2B (#133). If the destination is the image forming device 2A (No in #133), a fax document is printed as in the conventional manner based on the fax data (#138). If the destination is the image forming device 2B (Yes in #133), the fax data are sent to the image forming device 2B (#134).

If the instruction that a process of the fax transmission is to be performed is given by the image forming device 2B (Yes in #135), the fax data to be sent are received from the image forming device 2B, and it transmits the fax data via the public line after dialing to the destination designated by the image forming device 2B (for example, the fax terminal outside the image processing cooperating system 1) (#136). In other words, relay of the fax data is performed. Then, the result of the transmission (relaying) process is sent to the image forming device 2B that issued the instruction (#137).

If the user operated the operation panel 20f of the image forming device 2A so as to issue the fax sending instruction (No in #135), an original is scanned for generating fax data as in the conventional manner so that the data are sent to the designated destination after the user dials the number of the designation (#138).

With reference to FIG. 13 again, if the image forming device 2A receives an instruction to scan the image of the original and to send the image data of the original to a designated destination (Yes in #14), a process of the procedure as shown in FIG. 15 is performed (#15).

If the original contains only one page (No in #141 in FIG. 15), the image on the page is read (#147), and image data of the image is sent as an image file to the destination designated by the user (#148). Thus, the scan transmission process is finished (Yes in #149).

If the original contains plural pages (Yes in #141), it is checked whether the image forming device 2 of the destination designated by the user includes a storage medium having a capacity more than a predetermined capacity (#142). If it does not include the storage medium (No in #142), one page of the original is scanned so that image data on the image are sent to the other image forming device 2 every time when the image is read (#147 and #148). If it includes the storage medium (Yes in #142), pages of the original are scanned sequentially (#143). When image data of all pages are generated (Yes in #144), these image data are bound to generate one image file (#145). Then, the image file is sent to the other image forming device 2 (#146). Note that it is possible to decide a type of the storage medium instead of deciding a capacity of the storage medium in the step #142. For example, it is possible to perform the process in the steps #143-145 if a hard disk drive is provided as the storage medium.

With reference to FIG. 13 again, if the user makes an instruction concerning the personal box (Yes in #16), the image forming device 2A performs a process of the procedure as shown in FIG. 16 (#17).

For example it is supposed that the personal box sharing function of the image forming device 2A is set so that it can be used by the image forming device 2B (Yes in #151 in FIG. 16). If the user requests to display a list of a structure of his or her personal box (stored files and the like) by operating the image forming device 2B (Yes in #152 and Yes in #153), information about a structure of the personal box of the user that is provided to the image forming device 2A (file names, sizes and storage dates of the files) is extracted (#158) and is sent to the image forming device 2B as box information 62 (#159). If the user requests to display a list of a structure of his or her personal box by operating the image forming device 2A (No in #153), the image forming device 2B is requested to extract the box information 62 about the structure of the personal box of the user that is provided to the image forming device 2A (#154), and to send to the image forming device 2A the box information 62' about the structure of the personal box of the user that is provided to the image forming device 2B (#155). When the box information 62' is received from the image forming device 2B (#156), a list of the structure of the personal boxes of the user that are respectively provided to the image forming device 2A and the image forming device 2B is displayed as the list screen HG2 shown in FIG. 17 on the display 20f1 of the image forming device 2A (see FIG. 3) in accordance with the box information 62, 62' (#157).

On the other hand, cooperating partner of the image forming device 2A (for example, the image forming device 2B) performs the following process if necessary in parallel with the process performed by the image forming device 2A as shown in FIGS. 13-16.

An instruction from the user of the image forming device 2B is received, or data are received from the image forming device 2A (#21 in FIG. 18).

If an instruction or data about fax transmission and reception are received (Yes in #22), the process of the procedure as shown in FIG. 19 is performed (#23).

More specifically, if an instruction is issued by the image forming device 2A, which indicates that the fax data sent by the fax terminal outside the image processing cooperating system 1 should be received (Yes in #171 in FIG. 19), the image forming device 2B receives the fax data from the image forming device 2A (#172), and the fax document is printed in accordance with the fax data (#173).

On the other hand, if the user issues a fax data transmission instruction by operating the operation panel 20f of the image forming device 2B (No in #171), an image of the original is read so as to generate fax data, which are transmitted to the image forming device 2A together with information indicating the destination designated by the user. Thus, the image forming device 2A is instructed to perform the fax transmission job (#174). When an execution result of the fax transmission job is received from the image forming device 2A (Yes in #175), the fax data transmission process is finished (#176).

With reference to FIG. 18 again, if it receives from the other image forming device 2 an instruction to receive the image file of the scanned image of the original (Yes in #24), a process of the procedure as shown in FIG. 20 is performed (#25).

If the original contains plural pages and the instruction is made by the image forming device 2A for example, the image forming device 2A informs that all pages of the image data are already bound (Yes in #181 and Yes in #182 in FIG. 20). Then, the bound image file is received from the image forming device 2A (#186), and it is stored in a predetermined personal box (#187).

If the original contains only one page (No in #181), the image file is received (#186) as in the conventional manner, and it is stored in a predetermined personal box (#187).

If the original contains plural pages and a notice indicating that the image data are already bound is not received (Yes in #181 and No in #182), the image file is sent one by one page from the image forming device 2 that made the instruction (#183). When all pages of the image file are received (Yes in #184), these are bound into one image file (#185), and the bound image file is stored in a predetermined personal box (#187).

With reference to FIG. 18 again, if the user issues an instruction concerning the personal box (Yes in #26), the image forming device 2B performs a process that is the same as the process performed by the image forming device 2A that is described above with reference to FIG. 16 (#27).

If the other image forming device 2 requested information about a structure of the personal box of the user (Yes in #153 in FIG. 16), information about a structure of the personal box of the user (box information 62) that is provided to the image forming device 2B is extracted and is sent to the other image forming device 2 (#158 and #159). If the user requested to display a list of the structure of the personal box by operating the operation panel 20f of the image forming device 2B (No in #153), the other image forming device 2B is requested to extract information about a structure of the personal box of the user that is provided to the image forming device 2B, and to send to the image forming device 2B information about a structure of the personal box of the user that is provided to the other image forming device 2 (#155). When the information is received (#156), a list of the structure of the personal boxes of the user that are respectively provided to the image forming device 2B and the other image forming device 2 is displayed on the display 20f1 of the image forming device 2B like the list screen HG2 as shown in FIG. 17 (#157).

According to this embodiment, when a new function is added to the image processing device 2, it is possible to do a work for the other image processing device 2 that enables a cooperating process using the function without placing a burden on an administrator.

Although the other image forming device 2 or the terminal device 3 is informed that a new function is added to the image forming device 2 in this embodiment, it is possible to notice the user by means of electronic mail or the like.

Although the user information table TB1, the extension function information table TB2, the function adding process information table TB3 and the MFP-specific extension function information table TB4 are provided to each image forming device 2 in this embodiment, it is possible to prepare a sever in the image processing cooperating system 1 so that the server is provided with these tables that are shared by the image forming devices 2.

Although the image forming device 2 detects a function that becomes available by extension of new hardware or software and inform other image forming device 2 of the result of the detection in this embodiment, it is possible that the other image forming device 2 detects the function. In other words, the image forming device 2 informs the other image forming device 2 of the hardware or software when the hardware or software is extended. The other image forming device 2 that received the information refers to the extension function information table TB2 and detects a new function that is added to the image forming device 2 that made the information.

It is possible that when the image forming device 2 informs the other image forming device 2 of a function that has become available, it also informs the same of a method for changing setting that is necessary for performing the cooperating process by using the function. In other words, although the other image forming device 2 that received the information refers to the function adding process information table TB3 and determines a method for changing necessary setting in this embodiment, it is possible that the image forming device 2 to which the function is added decides the method for changing necessary setting and informs the other image forming device 2 of the result of the decision.

Although an example where the fax function, the personal box sharing function or the automatic bind transmission function is added is described in this embodiment, the present invention can be applied to other cases where other function is added. For example, if a function of two-sided printing is added to the image forming device 2, another image forming device 2 is informed of the fact. Then, the image forming device 2 changes setting that includes a menu screen and a module so that printing matters can be delivered from the image forming device 2 by using the two-sided printing function.

Furthermore, the structure of the entire or a part of the image processing cooperating system 1 or the image forming device 2, the process specifics, the process order, the contents of the tables, the functions to be added, the cooperating processes and the like can be modified in accordance with the spirit of the present invention if necessary.

The present invention can be used preferably in particular for realizing automation of works for improving functions in a system in which many image forming devices are provided and they are designed to perform a process in cooperation with each other.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing system comprising:
    a first image processing device; and
    at least one second image processing device for performing an image-related process about an image in cooperation with the first image processing device via a network, wherein the first image processing device is provided with:
    a storing portion for storing an extension function information table including a first group of first functions and a second group of second functions, each first function being associated with one of the second functions that is needed to perform the image-related process in cooperation with the first image processing device by using the associated first function,
    an added function detection portion for detecting a function that is added to the first image processing device as an added function,
    a cooperation capable device determination portion for automatically determining, based on the extension function information table in the storing portion, which at least one second image processing device has the second function that is associated with the added function in the extension function information table and that can perform the image-related process in cooperation with the first image processing device by using the added function detected by the added function detection portion, and a function addition informing portion for sending, to a second image processing device determined by the cooperation capable device determination portion to have the second function associated with the added function, notice information that indicates that the added function is added to the first image processing device, and wherein the determined second image processing device is provided with a notice information receiving portion for receiving the notice information, and a setting portion for setting the determined second image processing device so that the image-related process can be performed by using the added function indicated in the received notice information.

2. An image processing device for performing an image-related process about an image in cooperation with at least one other device that can be connected to the image processing device via a network, the image processing device comprising:

a storing portion for storing an extension function information table including a first group of first functions and a second group of second functions, each first function being associated with one of the second functions that is needed to perform the image-related process in cooperation with the image processing device by using the associated first function;

an added function detection portion for detecting a function that is added to the image processing device as an added function;

a cooperation capable device determination portion for automatically determining, based on the extension function information table in the storing portion, which at least one other device has the second function that is associated with the added function in the extension function information table and that is capable of performing the image-related process in cooperation with the image processing device by using the added function detected by the added function detection portion; and a function addition informing portion for informing the other device determined by the cooperation capable device determination portion to have the second function that the added function is added to the image processing device.

3. The image processing device according to claim 2, further comprising a setting method informing portion for informing the other device that is determined to be capable of performing the image-related process in cooperation with the image processing device by using the added function about a method for setting the other device so that the other device can perform the image-related process by using the added function.

4. The image processing device according to claim 2, wherein the network is a LAN, the image-related process is a fax data relaying process for relaying fax data that are sent and received between the other device and a fax terminal that can be connected to the other device via a public line, the added function detection portion detects a fax function that is a function about sending and receiving fax data as the function when the image processing device is equipped with a fax modem and a program for controlling the fax modem, and the cooperation capable device determination portion determines a device having a function of sending and receiving image data to be the other device that is capable of performing the fax data relaying process in cooperation with the image processing device by using the fax function.

5. The image processing device according to claim 2, wherein the image-related process is an image data management process for managing image data, the added function detection portion detects a personal box sharing function that is a function of sharing personal boxes by plural devices on a network as the added function when the image processing device is equipped with a hard disk drive, a program for managing the hard disk drive, and a program for managing personal boxes each of which is assigned to each of users, and the cooperation capable device determination portion determines a device having a function of managing personal boxes to be the other device that is capable of performing the image data management process in cooperation with the image processing device by using the personal box sharing function.

6. The image processing device according to claim 2, wherein the image-related process is a bind file sending and receiving process for binding plural pages of image data into one image file to communicate the image file, the added function detection portion detects a bind image file transmitting function that is a function of transmitting the image file to a device on a network as the function when the image processing device is equipped with a hard disk drive, a program for controlling the hard disk drive, and a program for binding plural pages of image data into one image file, and the cooperation capable device determination portion determines a device having a predetermined storage medium to be the other device that is capable of performing the bind file sending and receiving process in cooperation with the image processing device by using the bind image file transmitting function.

7. An image processing device for performing an image-related process about an image in cooperation with at least one other device that can be connected to the image processing device via a network, the image processing device comprising:

a storing portion for storing an extension function information table including a first group of first functions and a second group of second functions, each first function being associated with one of the second functions that is needed to perform the image-related process in cooperation with the image processing device by using the associated first function;

an added function detection portion for detecting a function that is added to the image processing device as an added function;

a cooperation capable device determination portion for automatically determining, based on the extension function information table in the storing portion, which at least one other device has the second function that is associated with the added function in the extension function information table and that is capable of performing the image-related process in cooperation with the image processing device by using the added function detected by the added function detection portion; and a setting portion for setting the image processing device so that the image processing device can perform, by using the added function, the image-related process in cooperation with the other device determined by the cooperation capable device determination portion to have the second function.

8. The image processing device according to claim 7, wherein the image-related process is a relaying process for receiving image data that were entered in the other device and transmitting the image data to a destination of transmission that was designated in advance, and the setting portion performs the setting so that the image processing device can perform the relaying process.

9. The image processing device according to claim 7, wherein the image-related process is a relaying process for receiving image data that are destined for the other device and sending the image data to the other device, and the setting portion performs the setting so that the image processing device can perform the relaying process.

10. The image processing device according to claim 7, wherein the image-related process is an image data management process for managing image data of each user, and the setting portion performs the setting so that the image data can be shared with the other device.

11. A method for setting an image processing device for performing an image-related process about an image in cooperation with at least one other device that can be connected to the image processing device via a network, the method comprising:
   storing an extension function information table including a first group of first functions and a second group of second functions, each first function being associated with one of the second functions that is needed to perform an image- related process in cooperation with the image processing device by using the associated first function;
   detecting a function that is added to the image processing device as an added function;
   determining automatically, based on the extension function information table stored at the storing step, which at least one other image processing device has the second function that is associated with the added function in the extension function information table and that can perform the image-related process in cooperation with the image processing device by using the added function detected at the detecting step; and
   informing the other image processing device determined at the determining step to have the second function associated with the added function that the added function is added to the image processing device.

12. The method according to claim 11, further comprising:
   informing the other image processing device that is determined to be capable of performing the image-related process in cooperation with the image processing device by using the added function about a method for setting the other image processing device so that the other image processing device can perform the image-related process by using the added function.

13. A method for setting an image processing device for performing an image-related process about an image in cooperation with another image processing device via a network, the method comprising the steps of:
   storing an extension function information table including a first group of first functions and a second group of second functions, each first function being associated with one of the second functions that is needed to perform an image-related process in cooperation with the image processing device by using the associated first function:
   detecting a function that is added to the other image processing device as an added function;
   determining automatically, based on the extension function information table stored at the storing step, whether the added function is associated with one of the second functions so that the image processing device can perform the image-related process in cooperation with the other image processing device by using the added function detected at the detecting step; and
   performing setting of the image processing device so that the image processing device can perform, by using the added function, the image-related process in cooperation with the other image processing device.

14. The method according to claim 13, wherein if the image-related process is an image data management process for managing image data of each user, the setting is performed so that the image data can be shared with the other image processing device.

15. The method according to claim 13, wherein when the image-related process is an image data management process for managing image data, detecting an added function includes detecting a personal box sharing function that is a function of sharing personal boxes by plural devices on a network as the added function when the image processing device is equipped with a hard disk drive, a program for managing the hard disk drive, and a program for managing personal boxes each of which is assigned to each of users, and determining the other image processing device includes determining a device having a function of managing personal boxes to be the other device that is capable of performing the image data management process in cooperation with the image processing device by using the personal box sharing function.

16. A non-transitory computer-readable storage medium storing a computer program for controlling an image processing device for performing an image-related process about an image in cooperation with another device that can be connected to the image processing device via a network, the computer program makes the image processing device execute the processes comprising:
   a process for storing an extension function information table including a first group of first functions and a second group of second functions, each first function being associated with one of the second functions that is needed to perform an image-related process in cooperation with the image processing device by using the associated first function;
   a process for detecting a function that is added to the other image processing device as an added function; and
   a process for determining automatically, based on the extension function information table stored at the storing process, whether the added function is associated with one of the second functions so that the image processing device can perform the image-related process in cooperation with the other image processing device by using the added function detected at the detecting process;
   a process for setting the image processing device so that the image processing device can perform, by using the added function, the image-related process in cooperation with the other image processing device.

17. The non-transitory computer-readable storage medium according to claim 16, wherein when the image-related process is an image data management process for managing image data, the computer program makes the image processing device execute the processes wherein:
   a process for detecting an added function includes detecting a personal box sharing function that is a function of sharing personal boxes by plural devices on a network as the added function when the image processing device is equipped with a hard disk drive, a program for managing the hard disk drive, and a program for managing personal boxes each of which is assigned to each of users, and a process for determining the other image processing device includes determining a device having a function of managing personal boxes to be the other device that is capable of performing the image data management process in cooperation with the image processing device by using the personal box sharing function.

\* \* \* \* \*